(12) United States Patent
Chang et al.

(10) Patent No.: US 8,852,806 B2
(45) Date of Patent: Oct. 7, 2014

(54) POSITIVE ACTIVE MATERIAL FOR SECONDARY BATTERY OF IMPROVED RATE CAPABILITY

(71) Applicant: LG Chem, Ltd., Seoul (KR)

(72) Inventors: Sung-Kyun Chang, Daejeon (KR); ByungChun Park, Daejeon (KR); Song Taek Oh, Daejeon (KR); SungJin Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/855,422

(22) Filed: Apr. 2, 2013

(65) Prior Publication Data

US 2013/0244105 A1     Sep. 19, 2013

Related U.S. Application Data

(63) Continuation of application No. PCT/KR2012/004900, filed on Jun. 21, 2012.

(30) Foreign Application Priority Data

Jun. 30, 2011    (KR) .................. 10-2011-0064271

(51) Int. Cl.
| | |
|---|---|
| *H01M 4/505* | (2010.01) |
| *H01M 4/525* | (2010.01) |
| *H01M 4/58* | (2010.01) |
| *H01M 4/64* | (2006.01) |
| *B60K 1/00* | (2006.01) |
| *B05D 5/12* | (2006.01) |
| *H01M 4/485* | (2010.01) |
| *H01M 10/0525* | (2010.01) |

(52) U.S. Cl.
CPC .............. *H01M 4/505* (2013.01); *Y02E 60/122* (2013.01); *H01M 4/525* (2013.01); *H01M 4/485* (2013.01); *H01M 10/0525* (2013.01); *Y02T 10/7011* (2013.01); *Y10S 903/907* (2013.01)
USPC ...... 429/223; 429/224; 429/231.95; 429/233; 429/149; 252/182.1; 180/65.1; 903/907

(58) Field of Classification Search
USPC ............ 429/211, 223, 319, 224, 233, 231.95, 429/149; 252/182.1; 903/907; 180/65.1
See application file for complete search history.

(56) References Cited

U.S. PATENT DOCUMENTS

| | | | | |
|---|---|---|---|---|
| 5,783,333 | A | * | 7/1998 | Mayer ........................ 429/223 |
| 2008/0070122 | A1 | | 3/2008 | Park et al. |
| 2009/0263707 | A1 | * | 10/2009 | Buckley et al. ............... 429/94 |
| 2010/0086854 | A1 | * | 4/2010 | Kumar et al. ................ 429/223 |
| 2010/0216030 | A1 | * | 8/2010 | Maeda ......................... 429/319 |
| 2011/0052989 | A1 | * | 3/2011 | Venkatachalam et al. .... 429/221 |
| 2011/0168944 | A1 | | 7/2011 | Chang et al. |

FOREIGN PATENT DOCUMENTS

| | | |
|---|---|---|
| KR | 10-2008-0026316 A | 3/2008 |
| KR | 10-2009-0037770 A | 4/2009 |

OTHER PUBLICATIONS

Johnson, C.S., "Development and utility of manganese oxides as cathodes in lithium batteries," Journal of Power Sources, Jan. 1, 2007, vol. 165, pp. 559-565 (abstract only).

* cited by examiner

*Primary Examiner* — Kenneth Douyette
(74) *Attorney, Agent, or Firm* — Birch, Stewart, Kolasch & Birch, LLP

(57) ABSTRACT

Disclosed is a novel cathode active material for secondary batteries. More specifically, disclosed is a cathode active material for secondary batteries that reduces deintercalation of oxygen from a crystal structure of $Li_2MnO_3$ at a high voltage of 4.3V to 4.6V through incorporation of excess lithium in a transition metal cation layer.

16 Claims, No Drawings

POSITIVE ACTIVE MATERIAL FOR SECONDARY BATTERY OF IMPROVED RATE CAPABILITY

CROSS REFERENCE TO RELATED APPLICATIONS

This application is a Continuation of PCT International Application No. PCT/KR2012/004900 filed on Jun. 21, 2012, which claims priority under 35 U.S.C 119(a) to Korean Application No. 10-2011-0064271 filed Jun. 30, 2011 in the Republic of Korea, all of which are hereby expressly incorporated by reference into the present application.

TECHNICAL FIELD

The present invention relates to a cathode active material for secondary batteries with improved rate properties. More specifically, the present invention relates to a cathode active material for secondary batteries that reduces deintercalation of oxygen from a crystal structure of $Li_2MnO_3$ at a high voltage of 4.3V to 4.6V through incorporation of excess lithium in a transition metal cation layer.

BACKGROUND ART

Technological development and increased demand for mobile equipment have led to a sharp increase in the demand for secondary batteries as energy sources. Among these secondary batteries, lithium secondary batteries having high energy density and driving voltage, long lifespan and low self-discharge are commercially available and widely used.

In addition, in recent years, increased interest in environmental issues has brought about a great deal of research associated with electric vehicles (EVs) and hybrid electric vehicles (HEVs) as substitutes for vehicles, such as gasoline vehicles and diesel vehicles, using fossil fuels which are major causes of air pollution.

Nickel metal hydride (Ni—MH) secondary batteries or lithium secondary batteries having high energy density, high discharge voltage and power stability are generally used as power sources of electric vehicles (EVs), hybrid electric vehicles (HEVs) and the like.

Lithium secondary batteries used for electric vehicles should have high energy density, exert high power within a short time and last for 10 years or longer under harsh conditions, thus requiring considerably superior stability and long lifespan, as compared to conventional small lithium secondary batteries.

In addition, secondary batteries used for electric vehicles (EVs), hybrid electric vehicles (HEVs) and the like require rate characteristics and power characteristics according to driving conditions of vehicles.

At present, as cathode active materials for lithium ion secondary batteries, lithium-containing cobalt oxide having a layered structure, such as $LiCoO_2$, lithium-containing nickel oxide having a layered structure, such as $LiNiO_2$, and lithium-containing manganese oxide having a spinel crystal structure, such as $LiMn_2O_4$ are used. A graphite material is generally used as an anode active material.

$LiCoO_2$ is currently used owing to superior physical properties such as cycle properties, but has disadvantages of low stability, high-cost due to use of cobalt, which suffers from natural resource limitations, and restriction of mass-use as a power source for electric automobiles. $LiNiO_2$ is unsuitable for practical application to mass-production at a reasonable cost due to many factors associated with preparation methods thereof.

On the other hand, lithium manganese oxides such as $LiMnO_2$ and $LiMn_2O_4$ have an advantage of use of manganese which is abundant as a raw material and is eco-friendly, thus attracting considerable attention as a cathode active material capable of replacing $LiCoO_2$. However, lithium manganese oxide also has a disadvantage of poor cycle properties.

$LiMnO_2$ disadvantageously has a low initial capacity and requires scores of charge/discharge cycles so as to obtain a predetermined capacity. In addition, $LiMn_2O_4$ suffers rapid capacity deterioration in cycle life and, in particular, disadvantageously causes sharp deterioration in cycle properties at a high temperature of 50° C. or higher due to decomposition of electrolyte and elution of manganese.

In this regard, Japanese Patent Application Publication No. 2003-086180 discloses a method for improving charge/discharge cycle properties by adjusting a mean oxidation number of manganese ions to 3.03 to 3.08 through substitution of a part of oxygen of $LiMnO_2$ by a halogen element.

In addition, Japanese Patent Application Publication No. 1999-307098 discloses a method for improving high-temperature cycle properties by substituting a part of oxygen of $LiMn_2O_4$ by a fluorine element.

In addition, Japanese Patent No. 3141858 discloses a method for improving power, energy density and cycle properties by coating the surface of active material particles such as $LiMnO_2$ and $LiMn_2O_4$ with a metal halogenized material and substituting oxygen in the particles by a halogen element to prepare a solid solution.

However, lithium manganese oxides such as $LiMnO_2$ and $LiMn_2O_4$ cannot secure a desired level of safety and have limitations as to improvement in energy density due to their crystalline structure in spite of these conventional methods.

Meanwhile, the lithium-containing manganese oxide includes $Li_2MnO_3$, in addition to $LiMnO_2$ and $LiMn_2O_4$. $Li_2MnO_3$ is unsuitable for use in a cathode active material for secondary batteries due to electrochemical inertness, in spite of considerably superior structural stability.

Accordingly, some conventional methods suggest solid solution treatment or mixing of $Li_2MnO_3$ with $LiMO_2$ (M=Co, Ni, $Ni_{0.5}Mn_{0.5}$, Mn). These cathode active materials have a broad domain in a high voltage region of 4.3V to 4.6V. This broad domain is known as a range in which lithium (Li) and oxygen (O) are deintercalated (left) from a crystal structure of $Li_2MnO_3$ and lithium is inserted into an anode.

The deintercalation of lithium and oxygen in the high voltage range of 4.3V to 4.6V imparts electrochemical activity to active materials and the broad region increases capacity, but decomposition of electrolyte and generation of gas may readily occur at high voltage due to oxygen gas generated in the battery, crystal structures are physically and chemically deformed during repeated charge/discharge, rate properties are deteriorated and, as a result, battery performance is disadvantageously deteriorated.

In addition, the cathode active material does not contribute to capacity due to lowered terminal region of discharge voltage when used for cellular phones, or it cannot practically realize high power, since it exhibits an unusable stage of charge (SOC) due to low power when used for vehicles.

Accordingly, there is an increasing need for methods capable of ultimately solving these problems.

DISCLOSURE

Technical Problem

Therefore, the present invention has been made to solve the above and other technical problems that have yet to be resolved.

As a result of a variety of extensive and intensive studies and experiments, the present inventor developed a cathode active material which exhibits improved rate properties through minimal deintercalation of oxygen from a crystal structure of $Li_2MnO_3$ at a high voltage of 4.3V to 4.6V, as described later. The present invention has been completed, based on this discovery.

Technical Solution

In accordance with one aspect of the present invention, provided is a cathode active material for secondary batteries having a structure in which excessive lithium is incorporated in a cation layer composed of a transition metal, thus reducing deintercalation of oxygen from a crystal structure at a high voltage of 4.3V to 4.6V, the cathode active material being represented by Formula 1:

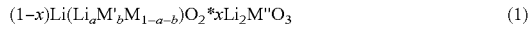  (1)

wherein
$0<x<0.3$;
$0<a<0.2$;
$0 \leq b \leq 0.2$;
M is at least one element selected from Ni and Mn;
M' is a transition metal excluding Ni and Mn; and
M" is at least one element selected from Mn, Sn and Ti.

Specifically, the cathode active material represented by Formula 1 is a composite or solid solution of $Li(Li_aM'_bM_{1-a-b})O_2$ which is lithium transition metal oxide having a layered crystal structure in which an amount of higher than 0 moles and lower than 0.2 moles of excess lithium is incorporated in a transition metal cation layer, and of $Li_2M"O_3$ which is a lithium transition metal oxide with a layered crystal structure.

When the content of lithium is higher than 0.2, disadvantageously, mole content of transition metal is decreased and capacity of cathode active material is thus decreased.

The cathode active material according to the present invention has a well-developed layered structure due to $Li_2M"O_3$ although it does not use expensive Co or, if used, an extremely small amount of Co is used, thus achieving superior rate properties. In addition, reduced preparation cost can be obtained as an economical effect through minimal use of Co.

In Formula 1, M, M' and M" are disposed at 6-coordination structure positions and at least one of M, M' and M" may be substituted by a metal or non-metal element which may have a 6-coordination structure in a predetermined amount. The substitution amount is preferably 10% or less, based on molar fraction. When the amount of substition is higher than 10%, disadvantageously, a desired capacity level cannot be obtained. The amount of substitution is more preferably 1% to 10%.

In an embodiment of the present invention, M is $Ni_{(1-a-b)/2}Mn_{(1-a-b)/2}$, more preferably $Ni_{0.5}Mn_{0.5}$ with superior structural stability.

In addition, M' may be Co. In Formula 1, when b is 0 mole, Co is not substituted together with M, and when b is 0.2 moles, 0.2 moles of Co is substituted together with M.

In addition, in Formula 1, O may be substituted in a predetermined amount by other anion. The other anion may be at least one element selected from the group consisting of fluorine (F), sulfur (S) and nitrogen (N).

Anion substitution advantageously improves bonding force with a transition metal, prevents structural variation of the active material and improves lifespan of the battery. On the other hand, when the anion substitution amount is excessively high (exceeding 0.5 molar ratio), the compound of Formula 1 is not maintained and lifespan characteristics may thus be deteriorated. Accordingly, the anion substitution amount is preferably lower than 20 mol %, more preferably 0.01 to 0.1 moles.

The present invention provides a cathode mix comprising the cathode active material and a cathode comprising the cathode mix. The cathode mix according to the present invention may optionally comprise a conductive material, a binder, a filler or the like, in addition to the cathode active material.

The conductive material is commonly added in an amount of 1 to 30% by weight, based on the total weight of the mixture comprising the cathode active material. Any conductive material may be used without particular limitation so long as it has suitable conductivity without causing adverse chemical changes in the battery. Examples of conductive materials include: graphite such as natural graphite or artificial graphite; carbon black such as carbon black, acetylene black, Ketjen black, channel black, furnace black, lamp black and thermal black; conductive fibers such as carbon fibers and metallic fibers; metallic powders such as carbon fluoride powders, aluminum powders and nickel powders; conductive whiskers such as zinc oxide and potassium titanate; conductive metal oxides such as titanium oxide; and conductive materials such as polyphenylene derivatives.

The binder is a component enhancing binding of an electrode active material to the conductive material and the current collector. The binder is commonly added in an amount of 1 to 30% by weight, based on the total weight of the mixture comprising the cathode active material. Examples of the binder include polyvinylidene fluoride, polyvinyl alcohol, carboxymethylcellulose (CMC), starch, hydroxypropylcellulose, regenerated cellulose, polyvinyl pyrrolidone, tetrafluoroethylene, polyethylene, polypropylene, ethylene propylene diene terpolymer (EPDM), sulfonated EPDM, styrene butadiene rubbers, fluororubbers and various copolymers.

The filler is a component optionally used to inhibit expansion of the electrode. Any filler may be used without particular limitation so long as it does not cause adverse chemical changes in the manufactured battery and is a fibrous material. Examples of the filler include olefin polymers such as polyethylene and polypropylene; and fibrous materials such as glass fibers and carbon fibers.

The cathode of the present invention may be, for example, fabricated by mixing the cathode mix comprising the compounds described above with a solvent such as NMP to prepare a slurry, and applying the slurry to a cathode current collector, followed by drying and pressing.

The cathode current collector is generally fabricated to have a thickness of 3 to 500 μm. There is no particular limit as to the cathode current collector, so long as it has suitable conductivity without causing adverse chemical changes in the fabricated battery. Examples of the cathode current collector include stainless steel, aluminum, nickel, titanium, sintered carbon, and aluminum or stainless steel surface-treated with carbon, nickel, titanium or silver. If necessary, these current collectors may be processed to form fine irregularities on the surface thereof so as to enhance adhesion to the cathode active materials. In addition, the current collectors may be used in various forms including films, sheets, foils, nets, porous structures, foams and non-woven fabrics.

The present invention also provides a lithium secondary battery comprising the cathode, an anode, a separator, and a lithium salt-containing non-aqueous electrolyte.

The secondary battery according to the present invention has advantages of, in addition to increased capacity and rate properties, improvement of safety through minimization of an amount of oxygen deintercalated (left) from the crystal structure and negative reaction with the electrolyte.

For example, the anode is prepared by applying an anode mix comprising an anode active material to an anode current collector, followed by drying. The anode mix may comprise the afore-mentioned components, if necessary.

Examples of the anode active materials that can be used in the present invention include carbon such as non-graphitized carbon and graphitized carbon; metal composite oxides such as $Li_xFe_2O_3 (0 \leq x \leq 1)$, $Li_xWO_2 (0 \leq x \leq 1)$ and $Sn_xMe_{1-x}Me'_yO_z$ (Me: Mn, Fe, Pb, Ge; Me': Al, B, P, Si, Group I, II and III elements of the Periodic Table, halogen atoms; $0 < x \leq 1$; $1 \leq y \leq 3$; and $1 \leq z \leq 8$); lithium metal; lithium alloys; silicon-based alloys; tin-based alloys; metal oxides such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, and $Bi_2O_5$; conductive polymers such as polyacetylene; and Li—Co—Ni based materials.

The anode current collector is generally fabricated to have a thickness of 3 to 500 μm. There is no particular limit as to the anode current collector, so long as it has suitable conductivity without causing adverse chemical changes in the fabricated battery. Examples of the anode current collector include copper, stainless steel, aluminum, nickel, titanium, sintered carbon, and copper or stainless steel surface-treated with carbon, nickel, titanium or silver, and aluminum-cadmium alloys. Similar to the cathode current collector, if necessary, the anode current collector may be processed to form fine irregularities on the surface thereof so as to enhance adhesion to the anode active materials. In addition, the current collectors may be used in various forms including films, sheets, foils, nets, porous structures, foams and non-woven fabrics.

The separator is interposed between the cathode and the anode. As the separator, an insulating thin film having high ion permeability and mechanical strength is used. The separator typically has a pore diameter of 0.01 to 10 μm and a thickness of 5 to 300 μm. As the separator, sheets or non-woven fabrics made of an olefin polymer such as polypropylene and/or glass fibers or polyethylene, which have chemical resistance and hydrophobicity, are used. When a solid electrolyte such as a polymer is employed as the electrolyte, the solid electrolyte may also serve as both the separator and electrolyte.

The lithium salt-containing, non-aqueous electrolyte is composed of an electrolyte and a lithium salt. As the electrolyte, a non-aqueous organic solvent, an organic solid electrolyte or an inorganic solid electrolyte may be utilized.

Examples of the non-aqueous organic solvent include non-protic organic solvents such as N-methyl-2-pyrollidinone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ethers, methyl propionate and ethyl propionate.

Examples of the organic solid electrolyte include polyethylene derivatives, polyethylene oxide derivatives, polypropylene oxide derivatives, phosphoric acid ester polymers, poly-agitation lysine, polyester sulfide, polyvinyl alcohols, polyvinylidene fluoride, and polymers containing ionic dissociation groups.

Examples of the inorganic solid electrolyte include nitrides, halides and sulfates of lithium such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$ and $Li_3PO_4$—$Li_2S$—$SiS_2$.

The lithium salt is a material that is readily soluble in the above-mentioned non-aqueous electrolyte and examples thereof include $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate and imides.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further contain halogen-containing solvents such as carbon tetrachloride and ethylene trifluoride. Further, in order to improve high-temperature storage characteristics, the non-aqueous electrolyte may further contain carbon dioxide gas or the like and may further contain fluoro-ethylene carbonate (FEC), propene sulfone (PRS), fluoro-propylene carbonate (FPC) and the like.

The secondary battery according to the present invention is preferably used for battery cells serving as a power source of small-sized devices and for a unit battery of middle and large sized battery modules including a plurality of battery cells used.

In addition, the present invention provides a battery pack comprising the battery module as a power source of a middle and large sized device. Preferably, examples of middle and large sized devices include, but are not limited to, power tools powered by battery-powered motors; electric vehicles including electric vehicles (EVs), hybrid electric vehicles (HEVs) and plug-in hybrid electric vehicles (PHEVs); and the like.

BEST MODE

Now, the present invention will be described in more detail with reference to the following examples. These examples are provided only to illustrate the present invention and should not be construed as limiting the scope and spirit of the present invention.

Example 1

A transition metal composite precursor was synthesized by a coprecipitation method such that a ratio of transition metals was adjusted to $Ni_{0.45}Mn_{0.55}$, and the transition metal composite precursor was mixed with $Li_2CO_3$ such that a molar ratio of Li to transition metal was 1.15:1. The mixture was incorporated into an electric furnace, was slowly heated at a rate of 5° C./min from room temperature, maintained at 950° C. for 7 hours, and cooled in air to synthesize $0.9Li(Li_{0.056}(Ni_{0.5}Mn_{0.5})_{0.944})O_2 * 0.1Li_2MnO_3$.

Example 2

$0.9Li(Li_{0.11}(Ni_{0.5}Mn_{0.5})_{0.89})O_2 * 0.1Li_2MnO_3$ was synthesized in the same manner as in Example 1, except that the transition metal composite precursor was mixed with $Li_2CO_3$ such that the ratio of Li to the transition metal was adjusted to 1.2:1.

Comparative Example 1

$0.9Li(Ni_{0.5}Mn_{0.5})O_2 * 0.1Li_2MnLO_3$ was synthesized in the same manner as in Example 1, except that the transition metal composite precursor was mixed with $Li_2CO_3$ such that the ratio of Li to transition metal was adjusted to 1.1:1.

Example 3

A transition metal composite precursor was synthesized by a coprecipitation method such that a ratio of transition metals was adjusted to $Ni_{0.4}Mn_{0.6}$, and the transition metal composite precursor was mixed with $Li_2CO_3$ such that a molar ratio of Li to transition metal was 1.25:1. The mixture was incorporated into an electric furnace, was slowly heated at a rate of 5° C./min from room temperature, maintained at 950° C. for 7 hours, and cooled in air to synthesize $0.8Li(Li_{0.0625}(Ni_{0.5}Mn_{0.5})_{0.9375})O_2 * 0.2Li_2MnO_3$.

Comparative Example 2

$0.8Li(Ni_{0.5}Mn_{0.5})O_2 * 0.2Li_2MnO_3$ was synthesized in the same manner as in Example 1, except that the transition metal composite precursor was mixed with $Li_2CO_3$ such that the ratio of Li to transition metal was adjusted to 1.2:1.

Example 4

A transition metal composite precursor was synthesized by a coprecipitation method such that a ratio of transition metals was adjusted to $Ni_{0.4}Mn_{0.5}Co_{0.1}$, and the transition metal composite precursor was mixed with $Li_2CO_3$ such that a molar ratio of Li to transition metal was 1.25:1. The mixture was incorporated into an electric furnace, was slowly heated at a rate of 5° C./min from room temperature, maintained at 950° C. for 7 hours, and cooled in air to synthesize $0.9Li(Li_{0.056}(Ni_{0.4}Mn_{0.5}Co_{0.1})_{0.944})O_2 * 0.1Li_2MnO_3$.

Comparative Example 3

$0.8Li(Ni_{0.5}Mn_{0.5})O_2 * 0.2Li_2MnO_3$ was synthesized in the same manner as in Example 4, except that the transition metal composite precursor was mixed with $Li_2CO_3$ such that the ratio of Li to transition metal was adjusted to 1.2:1.

Experimental Example

A slurry was prepared using each cathode active material synthesized in Examples 1 to 4 and Comparative Examples 1 to 3 and NMP such that a ratio of cathode active material:conductive material:binder was 90:6:4. The slurry was coated to a thickness of 20 μm on an aluminum foil (Al-foil) to obtain a coin-type battery.

An anode active material used herein was a Li-metal and an electrolyte used herein was a solution of 1M $LiPF_6$ in a solvent (consisting of ethylene carbonate (EC) and ethyl methyl carbonate (EMC) at a weight ratio of 3:7).

Charge/discharge capacities of the coin-type batteries were measured at 0.06 C and rate properties were evaluated by calculating a ratio of 1 C to 0.06 C.

C-rate was measured based on 1 C of 240 mAh/g. Charge/discharge was carried out at 2.0V to 4.6V and charge and discharge were measured at CC/CV and CV, respectively.

TABLE 1

Charge/discharge capacity

| | Charge capacity at first cycle (mAh/g) | Discharge capacity at first cycle (mAh/g) |
|---|---|---|
| Ex. 1 | 238.0 | 210.0 |
| Ex. 2 | 244.3 | 211.2 |
| Comp. Ex. 1 | 212.8 | 191.8 |
| Ex. 3 | 265.8 | 220.0 |
| Comp. Ex. 2 | 250.0 | 201.3 |
| Ex. 4 | 250.5 | 210.7 |
| Comp. Ex. 3 | 238.6 | 196.9 |

As can be seen from Table, Examples exhibited increased charge/discharge capacity as compared to corresponding Comparative Examples and Examples 1 to 3 exhibited a uniform increase in charge/discharge capacity as a content of lithium in the cathode active material increased. Example 4 exhibited a slight decrease in charge/discharge capacity, as compared to Example 3, since Co was present in the transition metal precursor and a content of Mn was lower than that of Example 3.

TABLE 2

Rate property

| | Second 1.0 C cycle/second 0.06 C cycle (capacity ratio %) |
|---|---|
| Ex. 1 | 80.9 |
| Ex. 2 | 83.8 |
| Comp. Ex. 1 | 70.4 |
| Ex. 3 | 84.3 |
| Comp. Ex. 2 | 75.6 |
| Ex. 4 | 83.3 |
| Comp. Ex. 3 | 78.4 |

As can be seen from Table 2 above, respective Examples exhibited improved rate properties, as compared to corresponding Comparative Examples, and Examples 1 to 3 exhibited a uniform increase in rate properties, as the content of lithium in the cathode active material increased. Example 4 exhibited a slight decrease in rate properties, as compared to Example 3, since Co was present in the transition metal precursor and a content of Mn was lower than that of Example 3.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the afore-going, the cathode active material according to the present invention can minimize deintercalation of oxygen (O) from a crystal structure in a broad high voltage region of 4.3V to 4.6V during charge, since excessive lithium is incorporated in a transition metal cation layer.

In addition, the cathode active material according to the present invention exerts superior rate properties even when Co is used in a considerably low amount or is not used.

Furthermore, the secondary battery according to the present invention comprises a specific cathode active material, thus advantageously minimizing deintercalation of oxygen from a crystal structure and generation of gas caused by negative reaction with an electrolyte, improving safety, minimizing structural deformation, and improving lifespan properties as well as rate and power properties.

The invention claimed is:

1. A cathode active material for secondary batteries for reducing deintercalation of oxygen from a crystal structure at a high voltage of 4.3V to 4.6V through incorporation of excessive lithium in a cation layer composed of Ni and in a cation layer composed of Mn, the cathode active material being represented by Formula 1:

$$(1-x)\text{Li}(\text{Li}_a\text{M}'_b\text{M}_{1-a-b})\text{O}_2 \cdot x\text{Li}_2\text{M}''\text{O}_3 \quad (1)$$

wherein
0<x<0.3;
0<a<0.2;
0≤b≤0.2;
M is at least one element selected from Ni and Mn;
M' is a transition metal excluding Ni and Mn; and
M'' is at least one element selected from Mn, Sn and Ti,
wherein the compound of Formula 1 is a composite or solid solution with a layered structure.

2. The cathode active material according to claim 1, wherein at least one of M, M' and M'' are substituted by a metal or non-metal element which has a 6-coodination structure in an amount of 1 to 10%, based on molar ratio.

3. The cathode active material according to claim 1, wherein M is $\text{Ni}_{(1-a-b)/2}\text{Mn}_{(1-a-b)/2}$.

4. The cathode active material according to claim 1, wherein M is $\text{Ni}_{0.5}\text{Mn}_{0.5}$.

5. The cathode active material according to claim 1, wherein M' is Co.

6. The cathode active material according to claim 1, wherein oxygen of Formula 1 is substituted in a predetermined amount by other anion.

7. The cathode active material according to claim 6, wherein the anion is at least one selected from the group consisting of fluorine (F), sulfur (S) and nitrogen (N).

8. A cathode mix for secondary batteries comprising the cathode active material according to claim 1.

9. A cathode for secondary batteries in which the cathode mix according to claim 8 is applied to a current collector.

10. A lithium secondary battery comprising the cathode for secondary batteries according to claim 9.

11. The lithium secondary battery according to claim 10, wherein the lithium secondary battery has a ratio of 1 C to 0.06 C of 80% or higher.

12. A battery module comprising the lithium secondary battery according to claim 10 as a unit battery.

13. A battery pack comprising the battery module according to claim 12 as a power source of a device.

14. The battery pack according to claim 13, wherein the device is an electric vehicle, a hybrid electric vehicle, a plug-in hybrid electric vehicle or a power storage device.

15. The cathode active material according to claim 1, wherein the compound of Formula 1 is a composite with a layered structure.

16. The cathode active material according to claim 1, wherein the compound of Formula 1 is a solid solution with a layered structure.

* * * * *